US012288097B2

United States Patent
Front et al.

(10) Patent No.: US 12,288,097 B2
(45) Date of Patent: Apr. 29, 2025

(54) RESOURCE TUNING WITH USAGE FORECASTING

(71) Applicant: BMC Software, Inc., Houston, TX (US)

(72) Inventors: Yaron Front, Kiryat Motzkin (IL); Michele De Stefano, Soncino (IT); Marco Bertoli, Trecate (IT); Jeyashree Sivasubramanian, Framingham, MA (US); Komal Padmawar, Pune (IN); Nir Yavin, Kfar Szold (IL)

(73) Assignee: BMC Helix, Inc., Houston, TX (US)

( * ) Notice: Subject to any disclaimer, the term of this patent is extended or adjusted under 35 U.S.C. 154(b) by 565 days.

(21) Appl. No.: 17/649,543

(22) Filed: Jan. 31, 2022

(65) Prior Publication Data
US 2023/0244535 A1    Aug. 3, 2023

(51) Int. Cl.
| | | |
|---|---|---|
| G06F 9/50 | (2006.01) | |
| G06F 11/34 | (2006.01) | |
| G06N 20/00 | (2019.01) | |

(52) U.S. Cl.
CPC ........ *G06F 9/5033* (2013.01); *G06F 11/3409* (2013.01); *G06N 20/00* (2019.01)

(58) Field of Classification Search
CPC .. G06F 9/5033; G06F 11/3409; G06F 9/5011; G06F 2209/5019; G06F 11/3447; G06F 11/3452; G06F 2201/81; G06N 20/00
See application file for complete search history.

(56) References Cited

U.S. PATENT DOCUMENTS

| | | | |
|---|---|---|---|
| 2003/0110007 A1* | 6/2003 | McGee | G06F 17/15 702/179 |
| 2020/0104401 A1* | 4/2020 | Burnett | G06F 16/287 |
| 2022/0244954 A1* | 8/2022 | Kim | G06F 11/302 |

OTHER PUBLICATIONS

K. Desouza: "Creating a Balance Portfolio of Information Technology Metrics," IBM Center for The Business of Government, Using Technology Series, 2015, 45 pages.
(Continued)

*Primary Examiner* — Kenneth Tang
(74) *Attorney, Agent, or Firm* — Brake Hughes Bellermann LLP

(57) ABSTRACT

Described techniques determine performance metric values of a performance metric characterizing a performance of a system resource of an information technology (IT) system, and determine driver metric values of a driver metric characterizing an occurrence of an event that is at least partially external to the system resource. A correlation analysis may confirm a potential correlation between the performance metric values and the driver metric values as a correlation. A graph relating the performance metric to the driver metric may be generated. A plurality of extrapolation algorithms may be trained to obtain a plurality of trained extrapolation algorithms using a first subset of data points of the graph, and the plurality of trained extrapolation algorithms may be validated using a second subset of data points of the graph. A driver metric threshold corresponding to the performance metric threshold may be determined using a validated extrapolation algorithm.

19 Claims, 10 Drawing Sheets

(56) References Cited

OTHER PUBLICATIONS

The British Academy, Center for Multilevel Modeling, "Correlations in SPSS (Practical)", available online at <https://www.bristol.ac.uk/cmm/media/research/ba-teaching-ebooks/pdf/Correlations%20-%20Practical.pdf>, Nov. 1, 2018, 6 pages.

X. Zhang et al.: "How To Measure It Effectiveness: The Cio's Perspective," Journal of Information Technology Management, vol. XXIX, No. 4, Nov. 4, 2018, 22 pages.

X. Zhang et al: "ResTune: Resource Oriented Tuning Boosted by Meta-Learning for Cloud Databases," SIGMOD '21, Jun. 20, 2021, 13 pages.

Govt of Western Australia, Department of Training and Workforce Development, "Use Quadratic, Exponential, Logarithmic and Trigonometric Functions and Matrices", Feb. 8, 2009, 282 pages.

\* cited by examiner

FIG. 10

RESOURCE TUNING WITH USAGE FORECASTING

TECHNICAL FIELD

This description relates to resource tuning.

BACKGROUND

Many companies and other entities have extensive technology landscapes that include numerous Information Technology (IT) assets, including hardware and software. It is often required for such assets to perform at high levels of speed and reliability, while still operating in an efficient manner.

Various types of system monitoring methods are used to detect, predict, prevent, mitigate, or cure system faults that might otherwise disrupt or prevent monitored IT assets from achieving system goals. For example, it is possible to monitor various types of performance metrics characterizing aspects of system performance.

System usage, and related performance metrics, may be driven by factors that are partially or completely external to the system. For example, a driver of system usage for an ecommerce website may include a product launch date for a type of product sold on the website. An example driver for an insurance system may include a weather event that precipitates insurance claims. An example driver for a stock trading platform may include a change in commodity prices.

Such drivers may cause system instability, underperformance, or malfunction. For example, during times of high traffic that may occur in response to such drivers, a website may load slowly, or not at all, or a transaction may not be completed in a timely manner. Such failures may be extremely detrimental to a reputation and profitability of a business owner or operator.

SUMMARY

According to some general aspects, performance metric values of a performance metric characterizing a performance of a system resource of an information technology (IT) system may be determined, the performance metric having a performance metric threshold at which the performance of the system resource degrades. Driver metric values of a driver metric characterizing an occurrence of an event that is at least partially external to the system resource and having a potential correlation with the performance of the system resource may be determined. A correlation analysis to confirm the potential correlation as a correlation may be performed. Correlated value pairs of the performance metric values and the driver metric values may be identified, each value pair occurring at a corresponding point in time, based on the correlation. A plurality of extrapolation algorithms may be trained using a first subset of the correlated value pairs to obtain a plurality of trained extrapolation algorithms. The plurality of trained extrapolation algorithms may be validated using a second subset of the correlated value pairs to obtain a plurality of validated extrapolation algorithms. A validated extrapolation algorithm of the validated extrapolation algorithms may be selected, and a driver metric threshold corresponding to the performance metric threshold may be determined, using the validated extrapolation algorithm.

According to other general aspects, a computer-implemented method may perform the instructions of the computer program product. According to other general aspects, a system, such as a mainframe system, may include at least one memory including instructions, and at least one processor that is operably coupled to the at least one memory and that is arranged and configured to execute instructions that, when executed, cause the at least one processor to perform the instructions of the computer program product and/or the operations of the computer-implemented method.

The details of one or more implementations are set forth in the accompanying drawings and the description below. Other features will be apparent from the description and drawings, and from the claims.

BRIEF DESCRIPTION OF THE DRAWINGS

FIG. 10 is a second screenshot illustrating example uses and implementations of FIGS. 1-8.

DETAILED DESCRIPTION

Figure 1:
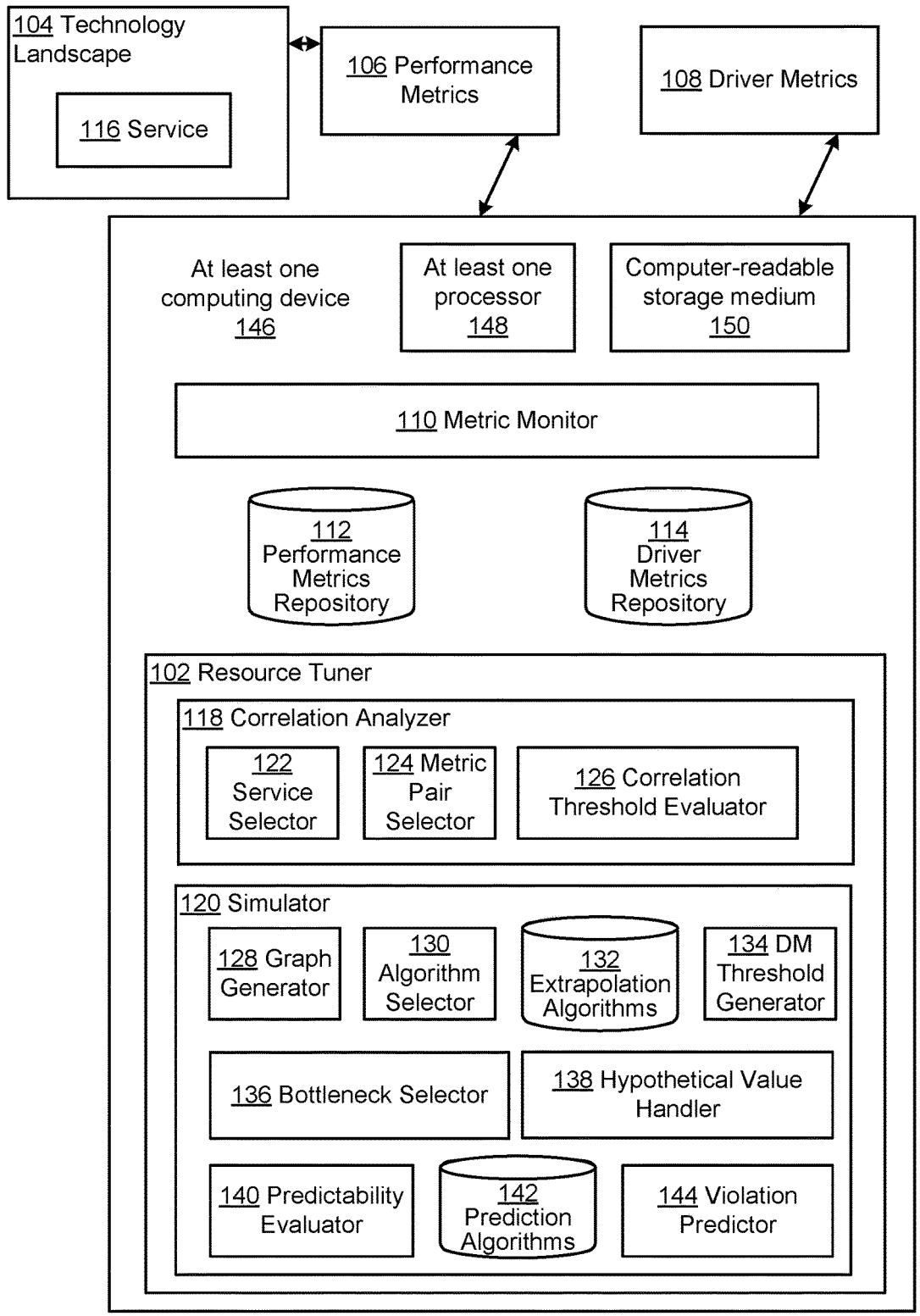
FIG. 1 is a block diagram of a resource tuning system with usage forecasting.

Described systems and techniques enable most appropriate tuning of system resources, e.g., of an IT landscape. The resource tuning uses performance metrics characterizing system performance, as well as driver metrics related to system usage that occurs in response to external drivers of such usage. By identifying and characterizing correlations between individual pairs of performance metrics and driver metrics, described techniques enable determination of potential system failures, so that appropriate corresponding action may be taken.

In the following description, a system refers to a collection of system resources, which may include many different types of hardware or software assets, such as may be found within an IT landscape. For example, a hardware resource may refer to a discrete hardware element, such as a processor or memory, or may refer to a computer (e.g., a laptop or desktop computer, mainframe, virtual machine, or a server), or may refer to a cluster of computers connected by various network elements (e.g., routers or switches, which may themselves represent hardware resources). A software resource may refer to any process(es) implemented using the hardware resources, such as a virtual machine, an application, or a software as a service. For example, in a business context, a discrete service may be implemented to perform a specific business function(s), and may be referred to as a business service.

Resource tuning refers to any change made to a system resource(s) that is designed to improve a functioning, responsiveness, reliability, efficiency, or other system aspect of the system. Resource tuning may include allocation or reallocation of system resources, such as allocating additional hardware resources for use by a software resource. Resource tuning may include addition of new resources to the system, such as deploying additional processors or memories within the system. Resource tuning may also include removal of a system resource that is degrading system performance in some way. Resource tuning may be performed proactively or retroactively. Resource tuning may also be referred to as, or include, resource management/planning/optimization, or capacity management/optimization/planning, or similar names.

A performance metric (PM) refers to any time series of numerical values characterizing a performance of any system resource(s). PMs may also be referred to as system metrics (SMs). Various systems may identify and use many different types of PMs for corresponding system assets.

For example, some PMs may characterize a percentage of central processing unit (CPU) resources in use at a given time, an amount of memory in use (e.g., an amount of memory allocated to a particular process), or data transfer rates or volumes between system components. In some examples, PMs may include, or be referred to as, key performance indicators, or KPIs.

A driver metric (DM) refers to any time series of numerical values characterizing, or related to or potentially causing, usage of any system resource(s). DMs, although measurable, may be partially or completely out of a control of a system owner or operator, but may substantially impact usage of system resources. In a business context, a DM may also be referred to as a business driver.

In specific examples, website traffic may represent a DM, because the website traffic represents individual external users choosing to access the website. In other examples, a price of gold may represent a DM for a stock trading platform, if the gold price causes different types or quantities of stock trades to occur. As also referenced above, weather events may be considered to be a source of DMs with respect to driving insurance claims of an insurance company.

Described techniques use correlations between PMs and DMs to enable resource tuning. For example, in the examples just given, increasing website traffic may lead to CPU/memory saturation of underlying hardware resources of the ecommerce website. Similar comments would apply to a website of an insurance company in response to increased insurance claims following a natural disaster, or to a stock trading platform following a large change in gold prices.

Conventional resource tuning systems are unable to make timely, effective use of such correlations. In contrast, described techniques are capable of identifying correlations between pairs of PMs and DMs, characterizing a type and extent of each correlation, and extrapolating specific DM values that result in corresponding performance failures within a system being monitored.

In some implementations, described techniques may be used to perform 'what if' analyses, enabling system owners and operators to determine potential performance failures that could occur in the event that a tested DM reaches a specific DM value. In additional implementations, described techniques may determine whether a particular DM is sufficiently predictable to enable a corresponding prediction of a paired, correlated PM. If so, then described implementations may enable prediction of a particular point in time at which a particular system resource will malfunction or fail.

FIG. 1 is a block diagram of a resource tuning system with usage forecasting. In FIG. 1, a resource tuner 102 facilitates and provides dynamic retuning of system resources of a technology landscape 104, as described herein.

In FIG. 1, a technology landscape 104 may represent any suitable source of performance metrics 106 that may be processed with respect to driver metrics 108 for resource tuning using the resource tuner 102. For example, in some embodiments the technology landscape 104 may represent, or include, one of the several examples provided above, such as an ecommerce website, an insurance company infrastructure, or a stock trading platform. In other examples, the technology landscape 104 may represent a mainframe computing environment, or any computing environment of an enterprise or organization conducting network-based IT transactions.

The technology landscape 104, however, is not limited to such environments. For example, the technology landscape 104 may include many types of network environments, such as network administration of a private network of an enterprise. Technology landscape 104 may also represent scenarios in which sensors, such as internet of things devices (IoT) are used to monitor environmental conditions and report on corresponding status information (e.g., with respect to patients in a healthcare setting, working conditions of manufacturing equipment or other types of machinery in many other industrial settings (including the oil, gas, or energy industry), or working conditions of banking equipment, such as automated transaction machines (ATMs)). In some cases, the technology landscape 104 may include, or reference, an individual IT component, such as a laptop or desktop computer, mainframe, virtual machine, or a server.

The performance metrics 106 may thus represent any corresponding type(s) of data that is captured and reported, particularly in an ongoing, dynamic fashion, and for a potentially large number of PMs. For example, in a setting of online sales or other business transactions conducted using a plurality of servers, the performance metrics 106 may characterize conditions of the servers as they are being used. In a healthcare setting, the performance metrics 106 may characterize either a condition of patients being monitored or a condition of IoT sensors being used to perform such monitoring. Similarly, the performance metrics 106 may characterize machines being monitored, or IoT sensors performing such monitoring, in manufacturing, industrial, energy, or financial settings.

In many implementations, the performance metrics 106 represent a real-time or near real-time stream of data that are frequently or constantly being received with respect to the technology landscape 104. For example, the performance metrics 106 may be considered to be received within defined time windows, such as every second, every minute, or every hour.

Each PM may be subject to, or defined with respect to, a PM threshold. Some such thresholds may be partially or completely inherent to an underlying system resource. For example, a memory may fail or become slow to access when sufficiently full. Other thresholds may be set in a manner desired by a system administrator or other authorized user, e.g., in order to meet Quality of Service (QoS) standards.

Meanwhile, the driver metrics 108 may represent any time series of data that may have a direct or indirect impact on one or more resources of the technology landscape 104, where such impact may be reflected in corresponding ones of the performance metrics 106. For example, the driver metrics 108 may be collected externally or independently from the technology landscape 104, such as when the DMs include weather data, financial data, or calendar events (e.g., holidays, or seasonal changes or events).

In other examples, the driver metrics 108 may be collected through, or using, the technology landscape 104. For example, a business may change prices of goods being sold by the business, which may lead to more or fewer purchases occurring through a website of the business. In these and other scenarios, user traffic represents examples of driver metrics 108 that may be influenced by an owner/operator of the technology landscape 104, even if the owner/operator does not have literal or direct control over such DMs.

In some cases, such as weather metrics and various types of financial metrics, an owner or operator of the technology landscape 104 will have no control over corresponding driver metric (DM) values. In other cases, such as a volume of website traffic, it may be possible to influence DM values to some extent, such as driving website traffic through extensive advertising, price reductions, or other promotions.

In FIG. 1, a metric monitor 110 receives the performance metrics 106 and the driver metrics 108 over time, e.g., in real time. The metric monitor 110 is shown as a singular module in FIG. 1, but may represent two or more metric monitors. The performance metrics 106 may be stored in a performance metrics repository 112 as a time series of PM values and corresponding timestamps. Similarly, the driver metrics 108 may be stored in a driver metrics repository 114 as a time series of DM values and corresponding timestamps.

The performance metrics 106 may be monitored in a manner that is particular to the type of underlying IT asset or resource being monitored. For example, received values (and value ranges) and associated units of PM measurement may vary widely, depending on whether, for example, an underlying resource includes processing resources, memory resources, or network resources (e.g., related to network bandwidth, or latency).

Similarly, the various driver metrics 108 may be collected by the metric monitor 110. The driver metrics 108 may also be collected using appropriate values, value ranges, and units. DMs that are detectable in the context of the technology landscape 104, such as DMs related to website traffic, may be captured and stored locally in the driver metrics repository 114. In other examples in which DMs are external to the technology landscape 104 but may affect the technology landscape, such as commodity prices or weather events, DM values may be obtained from any appropriate source. In such cases, DM values may be obtained on an as-needed basis, or may be collected and/or stored regularly or in anticipation of future use.

In example implementations, as referenced above, the technology landscape 104 may include one or more services, represented by a service 116 in FIG. 1. The service 116 may represent any function or feature provided by an organization, either internally or externally, that involves system resources of the technology landscape 104.

For example, the service 116 may represent a public website, an insurance claim system, or a stock trading platform. Thus, the service 116 may be internal or external to the organization. In the specific example of an insurance company, the service 116 may represent an insurance claim system that may be both internal and external. For example, internally, insurance agents may work with the claim system, but external customers may also be enabled to file claims using the service 116.

Consequently, the service 116 may utilize multiple hardware and/or software resources. For example, the service 116 may represent or utilize multiple individual applications, servers, networking devices, or other system resources of the technology landscape 104.

The service 116 may be one of many services provided within or by the technology landscape 104. The service 116 may be associated with many different ones of the performance metrics 106. Likewise, the service 116 may be associated with (e.g., potentially affected by) many different ones of the driver metrics 108.

In example implementations, the resource tuner 102 may include a correlation analyzer 118. As referenced above, and described in detail, below, the correlation analyzer 118 may be configured to evaluate potential correlations between individual pairs of PMs and DMs associated with the service 116.

Further, a simulator 120 may be configured to used one or more correlated PM/DM pairs to simulate a scenario, context, or situation in which a DM of a correlated PM/DM pair causes (or is very likely to be associated or otherwise correlated with) the corresponding PM of the correlated PM/DM pair to reach a threshold value associated with a warning, malfunction, underperformance, or failure.

By evaluating each relevant, correlated PM/DM pair, the simulator 120 is able to identify individual PMs to be used by the resource tuner 102 in performing subsequent system resource tuning. For example, the resource tuner 102 may allocate additional system resources (e.g., CPU or memory resources) to the service 116, or perform other resource tuning.

Upon actual or hypothetical allocation of system resources (or other resource tuning), the simulator 120 may provide further information, such as whether further allocation is needed, e.g., for the same or different system resource. Further, in some cases, the simulator 120 may be capable of predicting a point in time at which a value of a PM of a correlated PM/DM pair will reach a threshold value.

In more detail, the correlation analyzer 118 may include a service selector 122. The service selector 122 may be configured to select the service 116 from among a plurality of services (or, more generally, from among a plurality of system resources) for correlation analysis. The service selector 122 may also be configured to select, for the selected service 116, a plurality of related PMs from the performance metrics repository 112, and to select, for the selected service 116, a plurality of related DMs from the driver metrics repository 114. In so doing, the service selector 122 may use pre-stored relationships between the service 116 and corresponding PMs/DMs. In other examples, the service selector 122 may be configured to perform any suitable analyses to determine relevant PMs/DMs.

A metric pair selector 124 may be configured to form PM/DM pairs, using the selected, relevant PMs/DMs. For example, a single DM may be potentially correlated with two or more PMs of the selected PMs. The metric pair selector 124 may effectively iterate, for the DM, over the two or more PMs. Such iterations may continue for each DM and any potentially-correlated PM.

For each PM/DM pair having a potential PM/DM correlation, a correlation threshold evaluator 126 may be configured to determine whether the potential PM/DM correlation should be determined to be an actual correlation for purposes of subsequent use by the simulator 120. For example, as described in detail, below, the correlation threshold evaluator 126 may be configured to filter out potentially spurious correlations, evaluate correlation coefficients against a coefficient threshold, and/or filter unreliable correlations (e.g., when an insufficient number of metric values are available for analysis). Examples of correlation processing are illustrated and described in detail, below, e.g., with respect to FIGS. 3, 4, and 8.

Each correlated PM/DM pair determined by the correlation analyzer 118 may then be evaluated or otherwise processed by the simulator 120. For example, PM/DM value pairs, each pair occurring at a point in time, may be determined. For visualization purposes, a graph generator 128 may be configured to input all available or relevant PM values and DM values of a correlated PM/DM pair. The graph generator 128 may then generate graphs of the input values, such as a cross-plot graph that graphs the PM values against the DM values. Examples of such graphs are illustrated and described in detail, below, e.g., with respect to FIGS. 4, 5, 6, and 7. In various implementations, generation of such graphs may be omitted, and the PM/DM value pairs may be stored and processed directly. In other implementations, the graph generator 128 may generate the types of graphs described herein, or other types of graphs, if such visualizations are useful to (or desired by) a user.

An algorithm selector 130 may be configured to select an extrapolation algorithm from a plurality of extrapolation algorithms 132, based on the generated graph of the graph generator 128. That is, as described in detail, below, the algorithm selector 130 may be configured to select the extrapolation algorithm as the extrapolation algorithm that provides a best-available simulation of a response of PM values of the PM being tested against hypothetical DM values of the corresponding, correlated DM being tested.

Accordingly, a DM threshold generator 134 may use the selected extrapolation algorithm to generate a DM threshold value at which a PM value of the correlated PM being tested reaches a corresponding PM threshold value. Example operations of the DM threshold generator 134 are illustrated and described in detail, below, e.g., with respect to FIGS. 3 and 5-8.

In general, as discussed above, a PM threshold value may be known, either by virtue of a property of an underlying system resource (such as a quantity of available memory), and/or because a system administrator is capable of defining the PM threshold value (e.g., to enable compliance with relevant quality assurance (QA) requirements). In conventional approaches, however, a DM threshold value corresponding to a PM threshold value is not known, or is not determinable until if or when the PM threshold value is actually breached (which is often too late for practical purposes).

In contrast, the DM threshold generator 134 of FIG. 1 is configured to provide the DM threshold value of a correlated PM/DM pair, prior to the DM threshold value actually being reached. Accordingly, a user of the simulator 120 may determine a relative likelihood of the DM threshold value being reached, and may take appropriate action with respect to the system resource underlying the correlated PM (such as allocating additional system resources thereto). In this way, the user may minimize or avoid actual PM threshold violations.

As referenced above, a given DM may be associated with multiple PMs. For example, any of the example drivers mentioned above (e.g., commodity prices, weather events, website traffic) may impact two or more correlated PMs. The DM threshold generator 134 may thus determine a PM-specific DM threshold value for each correlated PM of the DM being tested, using the techniques referenced above.

A bottleneck selector 136 may be configured to select the lowest DM threshold value generated by the DM threshold generator 134. Then, the bottleneck selector 136 may determine the PM associated with the lowest DM threshold value, which may be referred to as the bottleneck PM.

In other words, for example, the bottleneck PM represents, for a DM with increasing DM values, the first PM to reach its corresponding PM threshold as the DM values rise. For example, if the DM is website traffic, then as the volume of website traffic rises, different PM values may reach corresponding PM threshold values, e.g., as underlying system resources are saturated. By determining the bottleneck PM, the bottleneck selector 136 enables a user of the simulator 120 to focus resource tuning of the resource tuner 102 on a corresponding system resource that is most in need of reallocation or other tuning efforts.

A hypothetical value handler 138 may be configured to receive hypothetical or 'what if' values for DMs and/or PMs, to assist in resource tuning efforts of the resource tuner 102. For example, the hypothetical value handler 138 may be configured to receive a hypothetical DM value to determine whether, when, and/or to what extent a correlated PM value may reach a PM threshold. For example, a what-if event may cause a PM saturation at a point in time following the what-if event, due to intervening system resource growth that may or may not be directly related to the what-if event. In other examples, a hypothetical PM value may be used, e.g., corresponding to a result of a hypothetical reallocation process that assigns greater or fewer system resources associated with the PM in question.

For example, a first driver metric (DM1) may be determined to be correlated with three different performance metrics (PM1, PM2, PM3). The bottleneck selector 136 may determine that PM1 is the bottleneck PM. If additional system resources are hypothetically assigned such that a PM threshold value for PM1 is increased, then the hypothetical value handler 138 may determine that PM3 becomes a new bottleneck PM, so the appropriate further action may be taken. This process may continue until all correlated PMs have projected values below their respective thresholds for an anticipated maximum value of DM1.

In other examples, multiple what-if events may be added, and the hypothetical value handler 138 may be configured to test the results with respect to multiple PMs. Further examples are illustrated and described below, e.g., with respect to FIG. 10.

Further in FIG. 1, a predictability evaluator 140 may be configured to determine whether one or more of a plurality of prediction algorithms 142 may be used to predict a future DM value of a DM being tested. If so, then a violation predictor 144 may be configured to predict a point in time at which the DM being tested reaches a DM threshold value corresponding to a PM threshold violation of a correlated PM.

In general, virtually all DMs are predictable to some extent, but corresponding extents of accuracy and reliability may not be sufficient for a desired purpose or situation. For example, the weather is notoriously difficult to predict, but weather predictions are nonetheless commonly made, because the weather predictions may be sufficiently accurate to avoid undesired bad outcomes. On the other hand, changes in website traffic volume may be highly and reliably predictable with respect, e.g., to seasonal patterns or time of day patterns.

Consequently, the predictability evaluator 140 may first receive a selection from a user that defines a DM to be predicted, along with a preference regarding a required level of accuracy and reliability. For example, a user may specify whether an aggressive or conservative level of predictability is allowed/required, and/or may specify a level of prediction reliability required.

The predictability evaluator 140 may then execute a selection process similar to the one performed by the algorithm selector 130 with respect to the extrapolation algorithms 132 to select an extrapolation algorithm to be used by the DM threshold generator 134. For example, the predictability evaluator 140 may split available PM values and DM values into a training dataset and a validation dataset. For example, the training data set may include a majority (e.g., 80%) of the data, while a minority (e.g., 20%) may be used for validation.

Then, each of the potential prediction algorithms 142 that is permissible based on the user prediction selections may be trained and validated. Prediction results above a specified validation or predictability threshold for a particular prediction algorithm may then enable use of the particular prediction algorithm by the violation predictor 144. Specifically, as shown and described in more detail, below, e.g., with respect to FIGS. 3, 7, and 8, the violation predictor 144 may predict future values of the DM in question to thereby predict and identify a point in time and corresponding DM value at which a violation of a corresponding PM threshold value occurs.

In the example of FIG. 1, the resource tuner 102, metric monitor 110, performance metrics repository 112, and driver metrics repository 114 are illustrated as being provided using at least one computing device 146. The at least one computing device 146 includes at least one processor 148 and a non-transitory computer-readable storage medium 150.

For example, the at least one computing device 146 may represent multiple computing devices in communication with one another. The at least one processor 148 may be configured to execute instructions stored on the computer-readable storage medium 150, e.g., to provide the metric monitor 110 and the resource tuner 102. The computer-readable storage medium 150 may also represent one or more memories used to store the repositories 112, 114.

Figure 2:
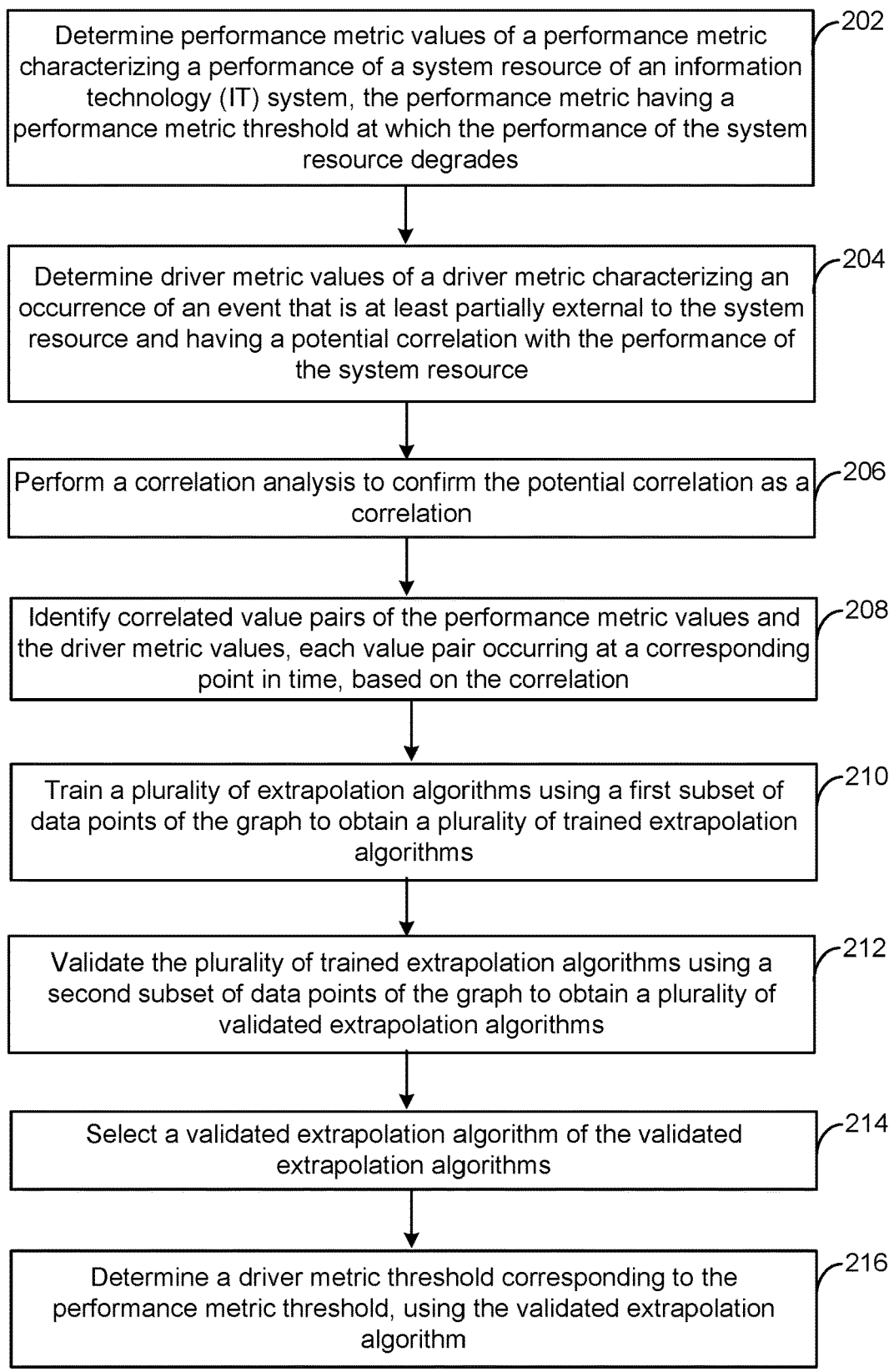
FIG. 2 is a flowchart illustrating example operations of the system of FIG. 1.

FIG. 2 is a flowchart illustrating example operations of the system of FIG. 1. In the example of FIG. 2, operations 202 to 216 are illustrated as separate, sequential operations. In various implementations, the operations 202 to 216 may include sub-operations, may be performed in a different order, may include alternative or additional operations, or may omit one or more operations. Further, in all such implementations, included operations may be performed in an iterative, looped, nested, or branched fashion.

In the example of FIG. 2, performance metric values of a performance metric characterizing a performance of a system resource of an information technology (IT) system may be determined, the performance metric having a performance metric threshold at which the performance of the system resource degrades (202). For example, the correlation analyzer 118 may access PM values stored in the performance metrics repository 112, and/or may receive PM values from the metric monitor 110. As described above, the PMs may characterize a performance of a system resource, such as the service 116 within the technology landscape 104.

Driver metric values of a driver metric characterizing an occurrence of an event that is at least partially external to the system resource and having a potential correlation with the performance of the system resource may be determined (204). For example, the correlation analyzer 118 may access DM values stored in the driver metrics repository 114, and/or may receive DM values from the metric monitor 110. As described above, the DMs may characterize events that potentially affect a performance of the system resource, such as the service 116 within the technology landscape 104, but that originate or occur outside of the service 116, or of the technology landscape 104. As is clear from the present description, some such events may be entirely external to the technology landscape 104 (e.g., the price of gold), whereas others may originate outside of the technology landscape while having some direct internal effect (such as external users who access a website of the technology landscape 104). In some cases, DM values may be derived from external events, such a DM value defined as a magnitude of change of the price of gold, rather than the price of gold itself.

A correlation analysis may be performed to confirm the potential correlation as a correlation (206). For example, the correlation threshold evaluator 126 may eliminate or filter spurious correlations, determine a correlation coefficient between the PM values and the DM values, and may determine a reliability of the correlation coefficient.

Correlated value pairs of the performance metric values and the driver metric values may be identified, each value pair occurring at a corresponding point in time, based on the correlation (208). For example, the original PM values and DM values represent time series of values, so that each of the PM values and the DM values may be paired at corresponding points in time. For example, for visualization purposes, the graph generator 128 may be configured to plot the PM values and the DM values against one another, e.g., in a cross-plot graph and/or as a point cloud of related values, each pair of values occurring at a point in time.

A plurality of extrapolation algorithms may be trained using a first subset of data points of the graph to obtain a plurality of trained extrapolation algorithms (210). For example, the algorithm selector 130 may be configured to train each (or a selected subset) of the extrapolation algorithms 132, using 80% (or another specified percentage) of the data points as the first subset of data points.

The plurality of trained extrapolation algorithms may be validated using a second subset of data points of the graph to obtain a plurality of validated extrapolation algorithms (212). For example, continuing the example above, a remaining 20% (or another specified percentage) of the data points may be used as the second subset of data points for validation.

A validated extrapolation algorithm of the validated extrapolation algorithms may be selected (214). For example, the algorithm selector 130 may select a validated extrapolation algorithm having a highest validation score.

A driver metric threshold corresponding to the performance metric threshold may be determined, using the validated extrapolation algorithm (216). For example, the DM threshold generator 134 may use the validated extrapolation algorithm to extend potential PM/DM value pairs within the graph generated by the graph generator 128, until a PM/DM value pair is determined at which the included PM value is at or above the PM threshold. Then, the corresponding DM value of that PM/DM value pair may be selected as the DM threshold value.

Figure 3:
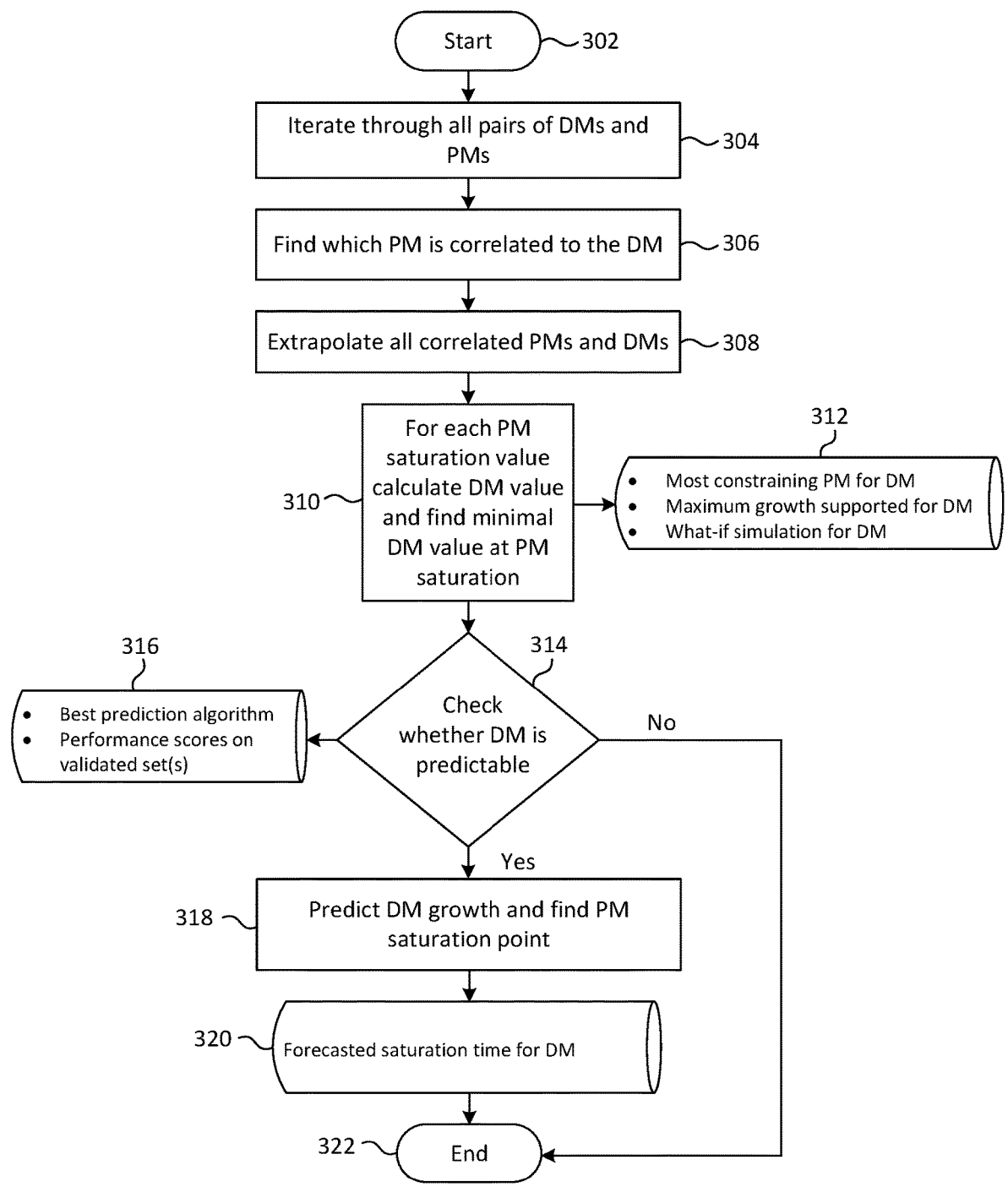
FIG. 3 is a more detailed flowchart showing more detailed example operations of the system of FIG. 1.

FIG. 3 is a more detailed flowchart showing more detailed example operations of the system of FIG. 1. In the example of FIG. 3, and consistent with FIG. 1, it is assumed that the service 116, which may be selected by the service selector 122 of FIG. 1, is associated with many different PMs having PM values stored within the performance metrics repository 112. It is further assumed that many different DMs have DM values stored within the DM repository 114, or otherwise accessible.

After a start operation (302), iterations through all of the relevant PMs and DMs may proceed, in order to determine all relevant PM/DM pairs (304). That is, for each considered DM, each possible PM that may be correlated with the considered DM may be tested for potential correlation, as referenced above with respect to the metric pair selector 124.

More detailed examples of such iterative processing for determining PM/DM pairs are provided below, e.g., with respect to FIG. 8.

Then, each potentially correlated PM/DM pair may be evaluated to determine whether an actual and sufficient correlation exists (306). For example, FIG. 4 illustrates an example of a potential correlation that is determined to be a correlation between DM values 402 and PM values 404.

Figure 4:
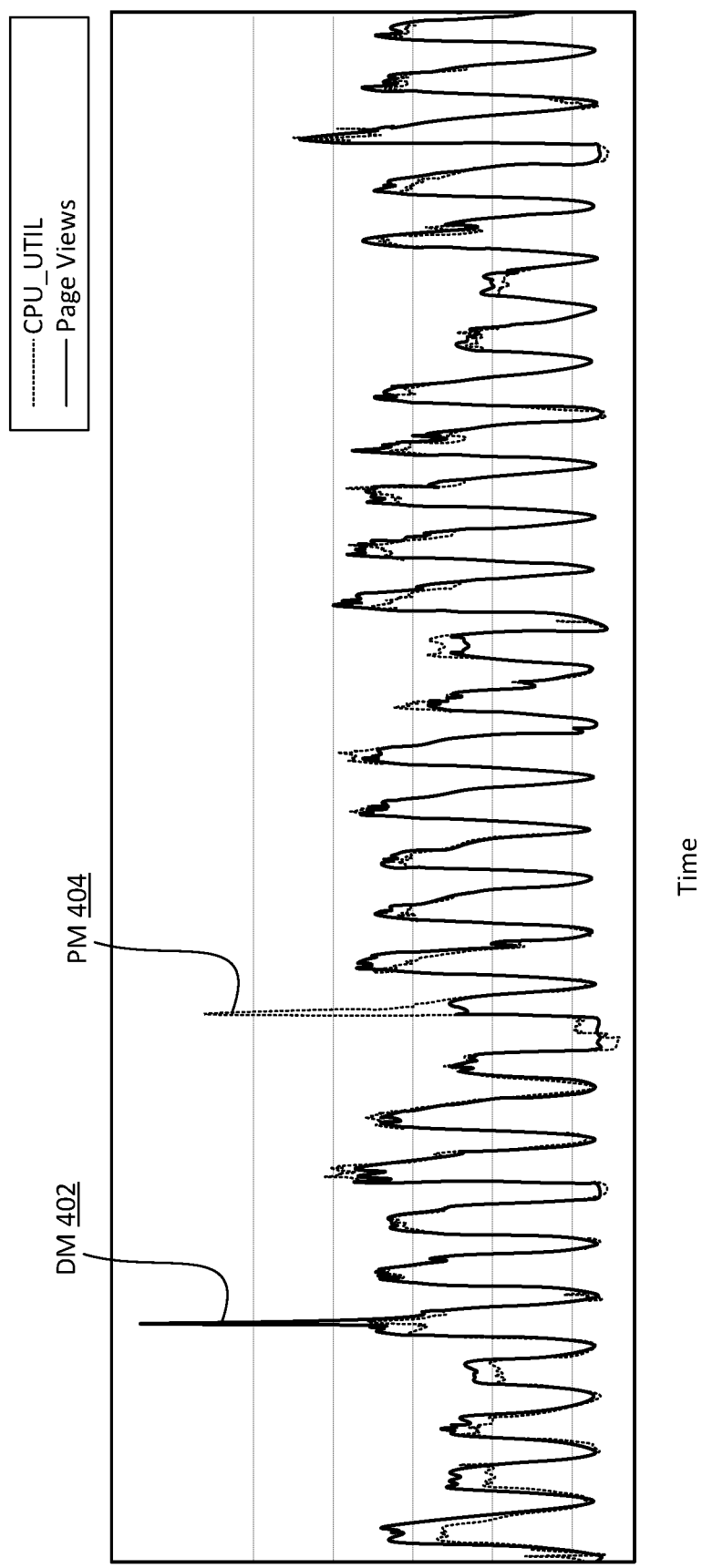
FIG. 4 is a time series graph illustrating correlation of performance metric and a driver metric.

In FIG. 4, the DM values 402 relate to page views of a website corresponding to the service 116. The PM values 404 relate to a characterization of a CPU utilization. The horizontal axis in FIG. 4 is time.

As shown, the two time series 402, 404 are very well correlated. In the example, and in related implementations, one of the time series (e.g., the DM 402) may be vertically rescaled to match the dynamic of the other time series (e.g., the PM 404), for visualization purposes. For example, different metrics may use different units of measurement, so that particular DM values may lead to, or be correlated with, PM values that are much larger or smaller than their corresponding DM values. Vertically rescaling one or both of the sets of PM/DM values enables visualization of the underlying correlation, notwithstanding the differences in units of measurement being used for each metric. For example, in FIG. 4, 'page views' may be measured as counts, while CPU utilization may be measured in percentages, and FIG. 4 illustrates that relative magnitudes of changes in these quantities are closely correlated in time.

To determine and evaluate correlation, one or more of multiple correlation evaluation techniques may be used. For example, the correlation analyzer 118, e.g., the correlation threshold evaluator 126, may remove a trend(s) in values of each of the time series 402, 404, which may contribute to spurious correlations.

For example, potential correlations between two variables may actually be caused by, or relate to, a third variable that is common to both of the two variables being tested, which may be referred to as a mutual dependency, confounder, or latent variable. In the context of time series of data, such as in FIG. 4, an example of such a variable may be an underlying trend experienced by both of the two variables being tested. More generally, the correlation threshold evaluator 126 may remove a first trend of the first time series 402 and remove a second trend of the second time series 404.

For example, for a time series being tested or observed individually, overall increases or decreases in values over time (i.e., trends) may be very useful to observe. However, in FIGS. 3 and 4, when examining relationships between two time series, the correlation threshold evaluator 126 may be configured to evaluate based on whether variations in one time series are correlated with variations in the other time series, not whether either or both time series happen to be experiencing an overall increase or decrease over time.

Therefore, for example, the correlation threshold evaluator 126 may model a potential trend(s) in the time series 402, 404, and then remove the modeled trend(s). Other non-parametric techniques may be used that do not require modeling. For example, it is possible to remove trends by considering relationships between pairs of values in the time series (e.g., differences or divisions), rather than using the actual time series values.

Then, once trend removal analysis is performed, a correlation coefficient may be calculated. One or more correlation coefficients may be used. For example, the Pearson coefficient may be used, and/or the Spearman coefficient may be used. Then, a threshold for tested coefficients may be applied.

In more specific examples, the Spearman p (rho) (i.e., the estimate of the Spearman correlation coefficient) may be set to 0.6. Other example threshold values may be used, and the threshold values may be adjustable and/or customizable.

Additionally, a probability value (p-value) may be determined to indicate a reliability of the tested correlation. A p-value represents a probability of a false positive when performing a hypothesis test with recorded data. In general, the estimate of the correlation coefficient characterizes an amount of correlation, while a hypothesis test is a test for assessing whether the PM and the DM are correlated (or not) at all.

A hypothesis test generally includes the hypothesis (also called the null hypothesis) and the alternative. The hypothesis test may be constructed such that the hypothesis is rejected if it has a low probability to happen with the given recorded data. For example, the null hypothesis may be: "The PM and the DM are not correlated," in which case the alternative would be: "The PM and the DM are correlated."

A false positive error (also referred to as a type 1 error) in this context includes declaring that the PM and the DM are correlated when they are not. Therefore, the correlation threshold evaluator 126 may also determine whether a possibility of such a false positive error is smaller than a reasonable threshold. Example thresholds for the false positive error (i.e., a p-value threshold) may be 5% or, to be more conservative, 1%. In example implementations, a default of 5% (i.e., 0.05) may be chosen.

If the computed correlation test p-value for the recorded PM and DM being tested is lower than this threshold, then the null hypothesis may be rejected and the two metrics may be considered to be correlated. On the other hand, when the computed p-value is higher than the threshold it is indeterminate whether the computed correlation coefficient comes from metrics that are correlated or not. For example, such an outcome may occur when too few samples for the PM and the DM are recorded.

Thus, in the example, a PM-DM correlation may be determined, following trend removal, if two conditions are met. First, that the computed Spearman rho is larger than a correlation threshold, and the hypothesis test p-value is lower than a reliability threshold.

As referenced above, while there may be a known threshold for each PM (e.g., a CPU utilization in the example PM 404 of FIG. 4), DMs do not have known DM thresholds that correlate with any useful degree of specificity to such PM thresholds. For example, in FIG. 4, conventional systems may have some recognition that higher numbers of page views relate to higher CPU utilization, but such a general or high-level recognition is not a precise enough basis for resource tuning.

In FIG. 3, however, because the two metrics are correlated as described, the threshold for the driver metric 402 may be derived from a known threshold of the PM, by using an extrapolation model. In other words, the simulator 120 may be configured to extrapolate values of each PM/DM pair (308). Then, using the extrapolation(s), the simulator may determine, for each PM threshold or saturation value, a corresponding DM threshold value, which then enables a determination of a minimal DM value at which PM saturation occurs (310).

Across all PM/DM pairs, the simulator 120 may thus determine various types of simulation data (312). For example, the bottleneck selector 136 may determine, for a given DM, a PM threshold that is reached first. In other words, the bottleneck selector 136 may determine a minimum DM value at which a first PM threshold is reached. Similarly, the bottleneck selector 136 may determine, a maximum amount of DM growth that can be tolerated before a PM threshold is met.

In other types of simulation data (312), what-if or hypothetical simulation data may be determined. For example, the hypothetical value handler 138 of FIG. 1 may be configured to receive potential increases in system resources that may be associated with higher PM thresholds being tolerated, and to then recalculate corresponding values for DM thresholds. Such simulations may be performed iteratively because improvement of a first PM bottleneck through allocation of additional system resources may lead to saturation of a second PM, which may then itself be tested for response to system resource allocation. These types of iterative simulations may be performed until a remaining PM bottleneck value is considered to be safe from reaching saturation.

In other what-if examples, it may be useful to determine a likely PM value for a corresponding DM value, even if neither threshold were to be reached. For example, it is possible to determine a PM value corresponding to a DM value that increases by a certain percentage or multiplier. Even if the determined PM value is below a PM threshold, such information may be useful. For example, a given PM may be impacted by multiple factors, and it may be desirable to maintain the PM a designated distance from its threshold in order to maintain a desired margin of error.

Figure 5:
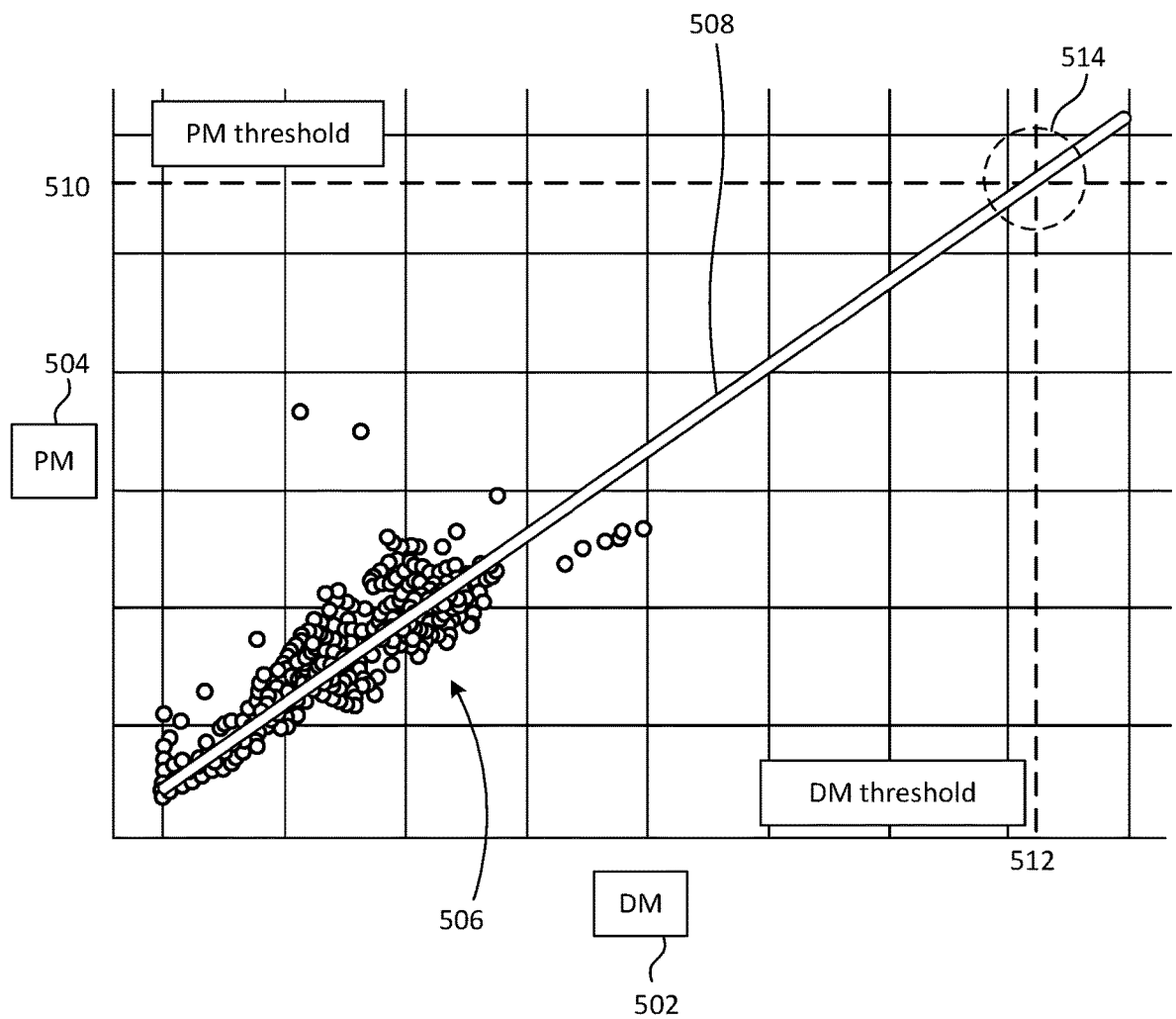
FIG. 5 is an example cross-plot graph corresponding to the time series graph of FIG. 4.
Figure 6:
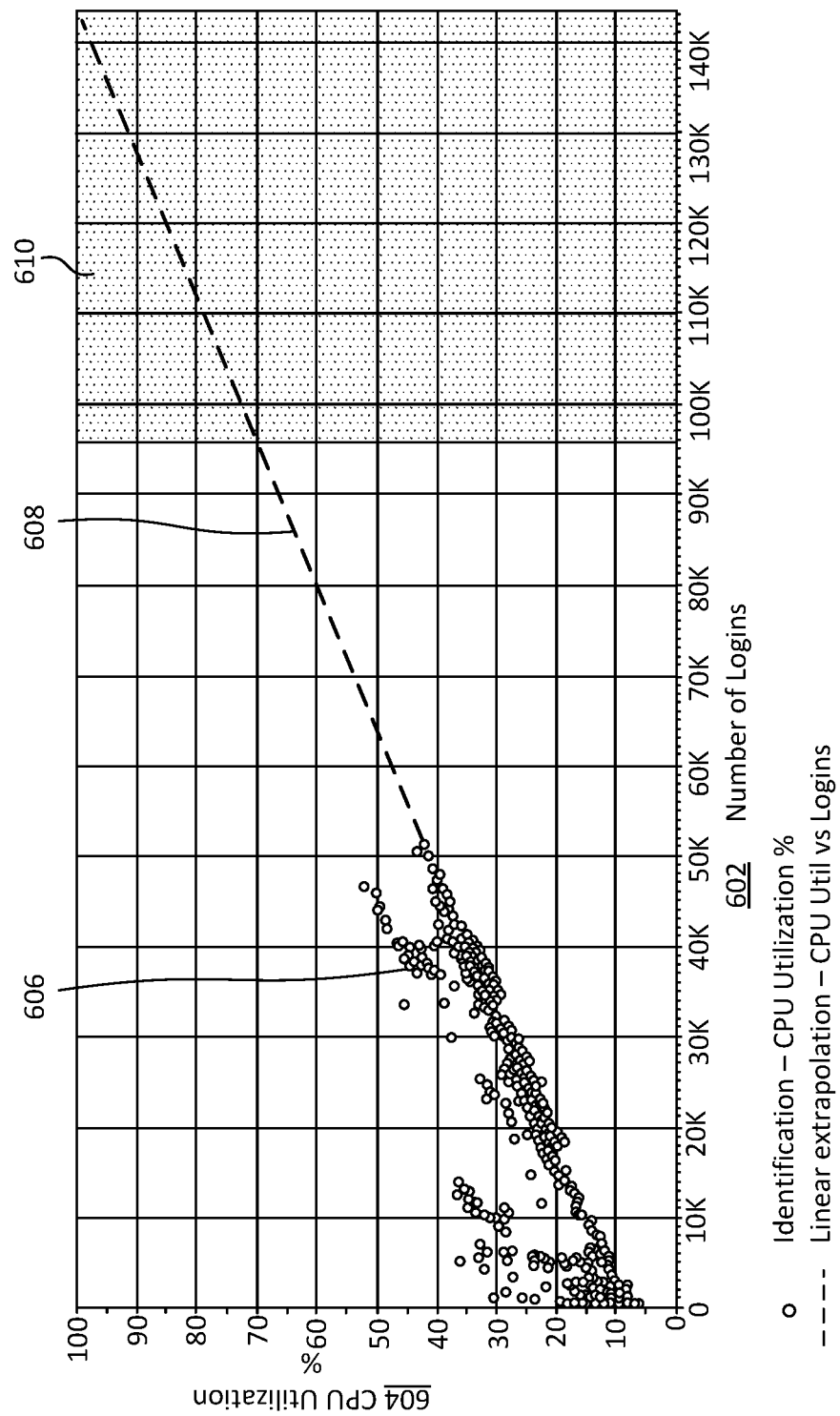
FIG. 6 is a second example of a cross-plot graph.

To perform such extrapolation-based simulations, as described with respect to FIG. 1 and illustrated in the examples of FIGS. 5 and 6, the graph generator of FIG. 1 may generate a cross-plot graph, such as shown in FIGS. 5 and 6. For example, with respect to FIG. 5, a horizontal axis relates to DM values 502, while a vertical axis relates to PM values 504. In other words, whereas FIG. 4 shows each of DM values 402 and PM values 404 graphed according to time, FIG. 5 shows each PM value graphed according to its corresponding DM value at the same point in time. Consequently, FIG. 5 illustrates a point cloud 506 of resulting PM/DM pairs.

Then, the algorithm selector 130 may be configured to choose an extrapolation algorithm from available extrapolation algorithms 132, which may then be used by the DM threshold generator 134 to project an extrapolation 508 in FIG. 5. As already described, it is assumed that a PM threshold 510 is known. Consequently, using the extrapolation 508, a DM threshold 512 may be identified at an intersection 514.

FIG. 6 shows a similar graph, in which DM values for numbers of logins are graphed on a horizontal axis, while corresponding PM values for CPU utilization percentage are graphed on a vertical axis. Similar to FIG. 5, a point cloud 606 is created, and, in the example, a linear extrapolation 608 enables determination of a graph region 610 corresponding to DM values exceeding a DM threshold.

In the simplified examples of FIGS. 5 and 6, a linear extrapolation model is used. As shown, an extrapolation model may include a regression over the cross plot of the two metrics. The regressed curve is then prolonged (i.e., extrapolated) out of the recorded samples region. That is, the regression curve is prolonged (extrapolated) over the values where the DM is larger than any recorded value. In this way, it is possible to forecast what is the maximum allowed value for the DM, when the corresponding PM reaches its threshold.

Of course, as described with respect to the extrapolation algorithms 132, any one of many different types of algorithms may provide the most accurate results with respect to a given PM/DM pair undergoing extrapolation. The algorithm selector 130 may provide an automatic choice of an extrapolation model, using cross-validation techniques to choose an extrapolation algorithm or model that best fits the given cloud of points. The models that may be used include, without limitation, Linear (linear regression sch as $y=c_0+c_1 x$), Quadratic (e.g., a 2nd order polynomial regression, with guaranteed monotonicity—$y=c_0+c_1 x^2$), Multiplicative exponential (e.g., regression of a multiplicative exponential trend—$y=c_0 \exp(c_1 x)$), Logarithmic (e.g., regression of an additive logarithmic trend—$y=c_0+c_1 \log(x)$), or Power law (e.g., regression of a multiplicative, power-law trend—$y=c_0 x^{c_1}$).

Training the various models above may include discovering the best $c_1$ coefficients such that the error between the recorded data and the regressed curve is minimized. The training may be performed using various optimization techniques. Furthermore, any of the regression models above has the option to be trained with an optimization algorithm that is robust against the presence of outliers.

In example implementations, the metric used during cross validation may include the mean absolute error, which may be more robust against outliers with respect to other metrics, e.g., the mean squared error. However, any suitable validation metric may be used.

For performing the cross validation, each model may be trained on 80% of the points in the cross plot. The remaining 20% may be used for comparing the predictions of the trained model with the recorded data. Of course, other percentages may be used.

Once the best regression model is chosen, e.g., based on the highest validation score determined, the discovery of the threshold for the DM may also be performed automatically. The DM threshold may then be found through the inversion of a linear or nonlinear (depending on the model) equation $f(x)=d$, where d is the level of the threshold for the PM. The discovered x would then be the DM threshold for the DM in question.

Other machine-learning algorithms, e.g., support vector regressors (SVRs), random forests (RFs) and neural networks (NNs), may additionally or alternatively be used. An SVR with a linear or polynomial kernel may be used instead of a linear or polynomial regression.

As described above, the predictability evaluator 140 of FIG. 1 may be configured to determine a degree to which a DM is predictable, as well as whether the DM is predictable (314). The DM's predictability may be used to determine if it is sufficient for an intended use in resource tuning. For example, the predictability evaluator 140 may be configured to train, validate, and evaluate each of a plurality of prediction algorithms 142. In this way, the predictability evaluator 140 may determine prediction data (316), including a best-performing prediction algorithm and related performance scores on validated prediction data.

For example, to determine whether, how, and to what extent a DM is predictable, an empirical approach may be used. For example, an automatic time forecasting algorithm may be used that is configured to choose the best time predictor based on cross validation.

For example, similar to the techniques described above with respect to the algorithm selector 130, a time series may be split into a first 80% portion and a last 20% during cross validation for future prediction. The predictability evaluator 140 may train each of the prediction algorithms 142 on the first 80%. Then predictions may be computed for the last 20%, so that the predictions may be compared with actual measurements.

The prediction algorithms 142 may include many different prediction or time forecasting algorithms. Some non-limiting examples are provided below, but it will be appreciated that many other prediction algorithms maybe used, as well.

As referenced above, and described in more detail, below, some of the prediction algorithms 142 may be more conservative or more aggressive in predicting a DM. In other words, a conservative algorithm may be more reliable in the predictions it does make, but may be less likely to be able to make a prediction. An aggressive algorithm may be more likely to make a prediction, but may have a higher margin of error when it does. A user may be provided with an ability to select a degree to which a conservative or aggressive prediction is allowed or desired, depending on, e.g., a margin of error desired by the user in performing resource tuning. In example implementations, the conservative mode may be used as a default, to avoid trying predictive algorithms that are considered to be uncommon for capacity optimization data.

In the following, a number of the example prediction algorithms use or include a LASTRAMP algorithm. A LASTRAMP algorithm is a twin or copy algorithm of an algorithm being tested with respect to a DM time series, but is trained on the last portion of the DM time series, discarding all the previous samples.

For example, the situation may occur in which a dramatic change in system behavior occurs and, consequently, the recordings exhibit a dramatic statistical change at a certain time instant (sometimes referred to as a regime change point). A LASTRAIVIP algorithm first tries to detect whether there is a regime change point in the time series, e.g., by exploiting a Kullback-Leibler divergence computation. If a change point is found, then the algorithm is trained using only the samples following the last found change point. Such a change can be detected, e.g., in the mean level of the signal or into the average slope.

An example prediction algorithm includes a LINEAR_TREND algorithm, in which linear regressions are performed on the recorded data, with extrapolation into the future. Another example prediction algorithm includes a ROBUSTLINEAR_TREND algorithm, in which a robust (against the presence of outliers) linear regression is performed on the recorded data, with extrapolation into the future. Another example prediction algorithm includes the ROBUSTLINEAR_LASTRAMP_TREND algorithm, which is a last ramp version of the previous algorithm. Another example prediction algorithm includes the ROBUSTLINEAR_SMOOTHEDLASTRAMP_TREND algorithm, in which the last ramp of the time series is smoothed with a low-pass filter, and then the ROBUSTLINEAR_LASTRAMP_TREND algorithm is applied.

Another example prediction algorithm includes the TIMESHIFT algorithm, in which the algorithm performs linear prediction of the time series by different sets. Each set groups all the samples belonging to the same "seasonal set". For daily data, there are 7 different sets, one for each weekday (all Mondays, all Tuesdays, etc.). For hourly data, there are 24 different sets, one for each hour of the day. For monthly data, there are 12 different sets, one for each month of the year. After the different sets have been predicted separately, the predictions may be recombined according to the original time sequence.

Another example prediction algorithm includes HOLTWINTERS, also known as the triple exponential damping algorithm. Another example prediction algorithm includes YEARLYTIMESHIFT, which is generally used when at least one year of data is available (but can be exploited also with less data, e.g., six months of data). This algorithm regresses and extrapolates the trend of the time series. After that it overlaps, with respect to the trend, an estimated yearly pattern, computed by averaging yearly recordings across the current and past years. The average is weighted, with weights that linearly decrease as samples from the past years are taken.

Another example prediction algorithm includes EXPONENTIALDAMPING, which smooths the time series with an exponential filter and then performs a robust linear prediction over the transformed data. Another example prediction algorithm includes EXPONENTIALDAMPING_LASTRAMP, which is a last ramp version of the previous algorithm.

Another example prediction algorithm includes BOXANDJENKINS, which uses an ARMA model plus automatic trend discovery and prediction. Another example prediction algorithm includes BOXANDJENKINS_LASTRAMP, which is a last ramp version of the previous algorithm.

The following example prediction algorithms may be used, in some implementations, in aggressive mode only. For example, such an algorithm includes the MULTIPLICATIVE_EXPONENTIAL algorithm, which predicts the time series by regressing and extrapolating in time a multiplicative exponential trend, plus an estimated seasonal component. Another example prediction algorithm includes the QUADRATIC algorithm, in which the time series is predicted by regressing and extrapolating in time an additive quadratic trend plus an estimated seasonal component. Another example prediction algorithm includes CUBIC: predicts the time series by regressing and extrapolating in time an additive cubic trend plus an estimated seasonal component.

There are several performance measures that can be checked for assessing the quality of the predictions being made. Some of these measures are, for example, the root mean squared error (RMSE), the mean absolute error (MAE), the median absolute error, the coefficient of determination (also known as the R2 score) and the mean absolute percentage error (MAPE).

In example implementations, the predictability evaluator 140 may utilize MAE as a predictability threshold. In such examples, the algorithm that achieves the lowest MAE in the last 20% of the time series may be chosen as the best predictor candidate.

To verify whether the time series is forecastable or not, a-dimensional scores may be used, such as the MAPE and the R2 score. These scores may be compared with predefined thresholds (a good MAPE may be defined as being close to zero, while a good R2 may be defined as tending toward 1) and if these scores pass the check, it is thereby determined possible to predict the time series in the future with the chosen model.

Then, the selected prediction algorithm may be used by the violation predictor 144 to predict DM growth and a corresponding PM saturation point (318). Accordingly, the violation predictor 144 may determine a forecasted saturation time for a PM correlated with the DM in question (320). That is, it is possible to determine a saturation risk of the PM violating its PM threshold, based on the predicted DM growth. At this point, or if the DM was not predictable (314), the process may end (322).

Figure 7:
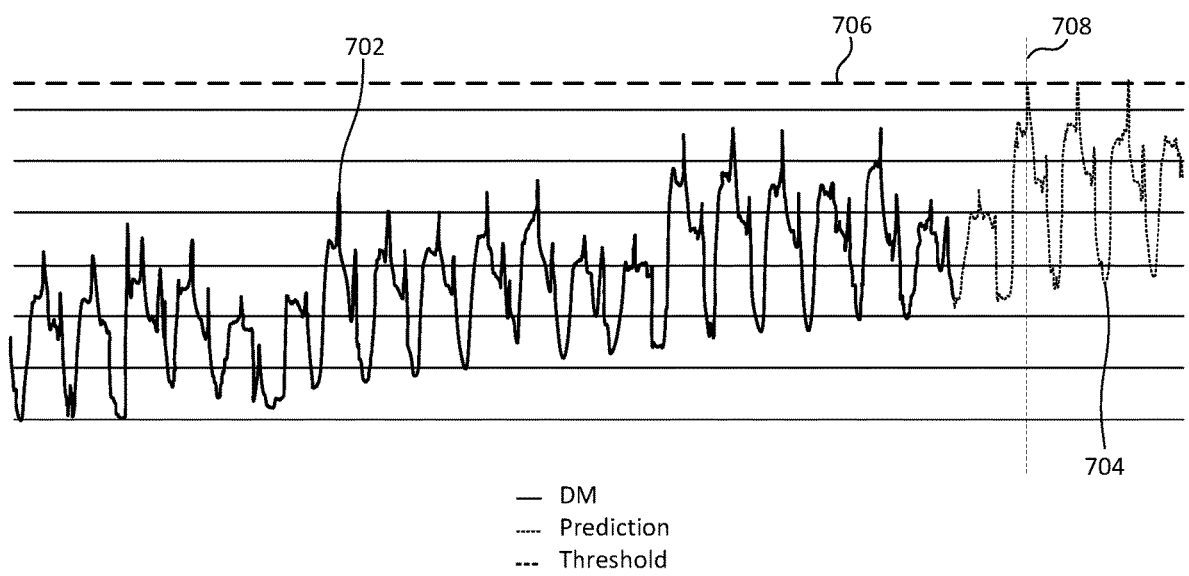
FIG. 7 is a time series graph showing predicted driver metric values.

FIG. 7 is a graph illustrating example results of the violation predictor 144 using a prediction algorithm determined by the predictability evaluator 140. In FIG. 7, an example DM time series 702 is illustrated. A determined prediction algorithm is used to forecast a predicted DM time series 704. A DM threshold 706 represents a DM threshold determined using the techniques of FIGS. 5 and 6.

Then, by crossing the predicted DM time series 704 with the DM threshold 706, it is possible to predict the first threshold violation as an intersection of 704 and 706. As the DM was previously correlated with a PM, a time 708 at which the correlated PM reaches its threshold may be predicted.

Figure 8:
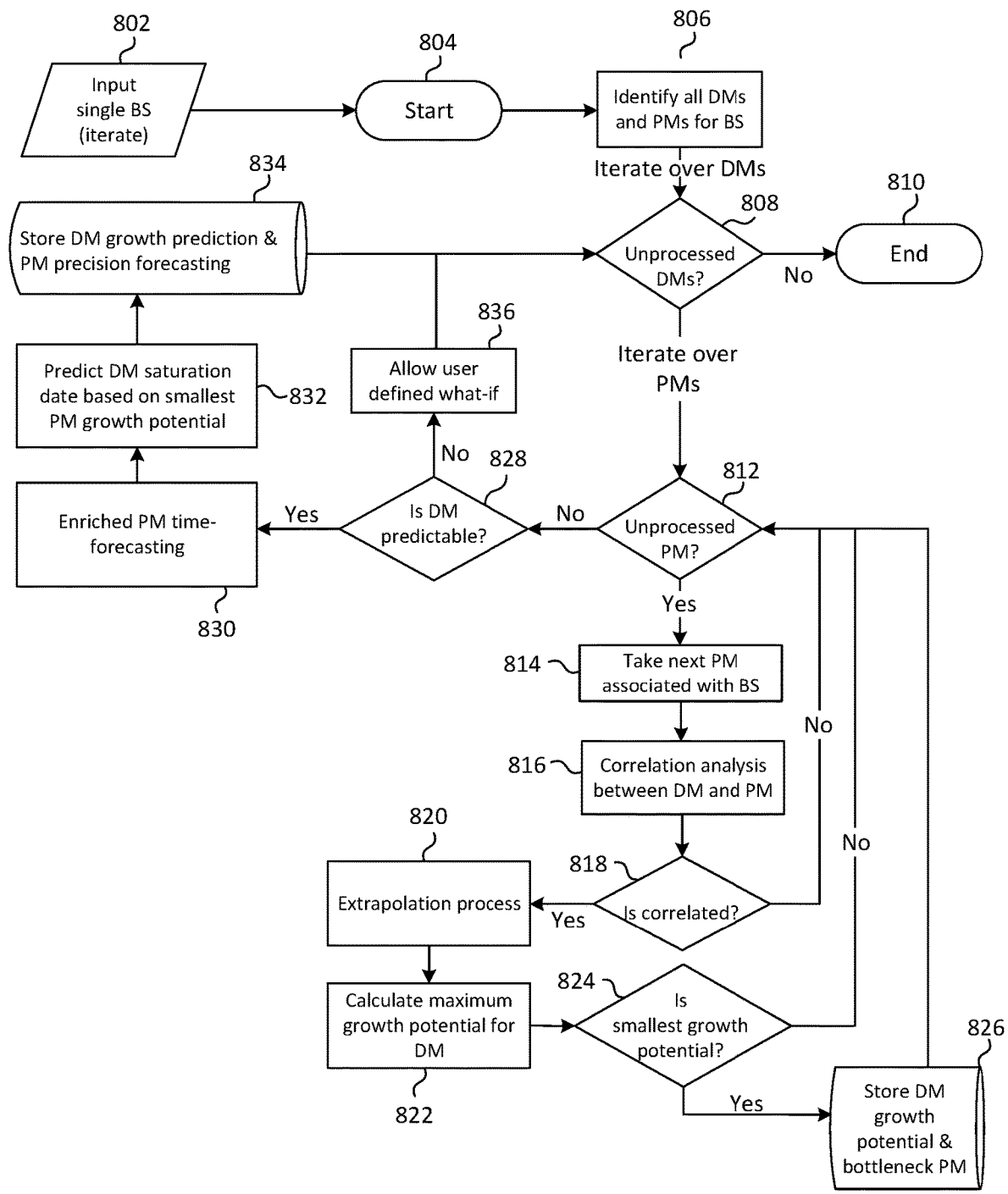
FIG. 8 is a flowchart illustrating the process of FIGS. 2 and 3, executed for a service.

FIG. 8 is a flowchart illustrating the process of FIGS. 2 and 3, executed for a service. In the example of FIG. 8, the service is referred to as a business service (BS).

In FIG. 8, a selection of a BS (802) leads to a process start (804). If multiple services exist, FIG. 8 may be iterated.

All associated DMs and PMs may then be identified (806). For example, an asset management system may be used, such as a discovery system to discover system resources or a configuration management database (CMDB) where system resources are stored.

As already described, each DM may be correlated with many PMs. Each correlated PM may indirectly impose a different threshold for the DM.

The process of FIG. 8 thus determines whether any unprocessed DMs are available (808). If not, the process ends (810).

If so (808), the process may iterate over all associated PMs by first determining whether any unprocessed PMs are available (812). If so, then an available PM is selected (814). Correlation analysis between the DM and PM may be performed (816), as described with respect to FIG. 3. If the PM/DM pair are not correlated (818), then a next unprocessed PM, if any, may be selected (812).

If the PM/DM pair are correlated (818), then the described extrapolation process may proceed (820), including, as shown in FIGS. 5 and 6, graphing a cross plot of the PM/DM values and using a selected extrapolation algorithm to determine a DM threshold.

Knowing the DM threshold, it is possible to determine a maximum growth potential for the DM in question (822). If, in the current iteration, the calculated maximum growth potential is the smallest growth potential determined among all iterations performed (824), then the DM growth potential and corresponding PM may be stored, e.g., as bottleneck PM data (826).

Then, or if the calculated DM growth potential is not the smallest among all completed iterations (824), then a check for further unprocessed PMs may be made (812). Thus, FIG. 8 illustrates that, among all determined thresholds, the smallest DM threshold is the most conservative for the DM supported growth. By comparing the DM with the most conservative threshold(s), it is possible to detect the overall system saturation point. Thus, among all the saturation points discovered for all the DMs of a business service being tested, the earliest one may be used as the whole business service saturation time instant.

If there are no remaining unprocessed PMs (812), then it may be determined whether the DM being tested is predictable (e.g., has low volatility, or is seasonal) (828). If so, then the previously-determined correlation may be used to enrich PM time-series data with interpolated values to thereby create an improved PM timeseries forecast (830). The enriched time forecasting and the trained extrapolation may be used to create a timeseries prediction for the DM in question and thereby predict a DM saturation date for the smallest PM growth potential (832). In this way, it is possible to obtain stored DM growth prediction data and PM precision forecasting data (834), that may then be used for system resource planning, service assurance, service optimization, risk mitigation, and other resource tuning operations.

If the DM being tested is not predictable (828), then user-defined what-if analysis may be provided (836). As described above, such what-if analysis may include various types and extents of user-provided forecasts for the DM in question, which may then be used to determine potential PM threshold violations.

Upon reaching an end (810), the process of FIG. 8 provides, e.g., growth potential for all DMs for the business service being tested. A saturation prediction for all DMs that can be predicted (or what-if analysis if the DM is not predictable) may be provided as well, along with enriched forecasting of one or more significant PM(s) for the business service being tested.

Figure 9:
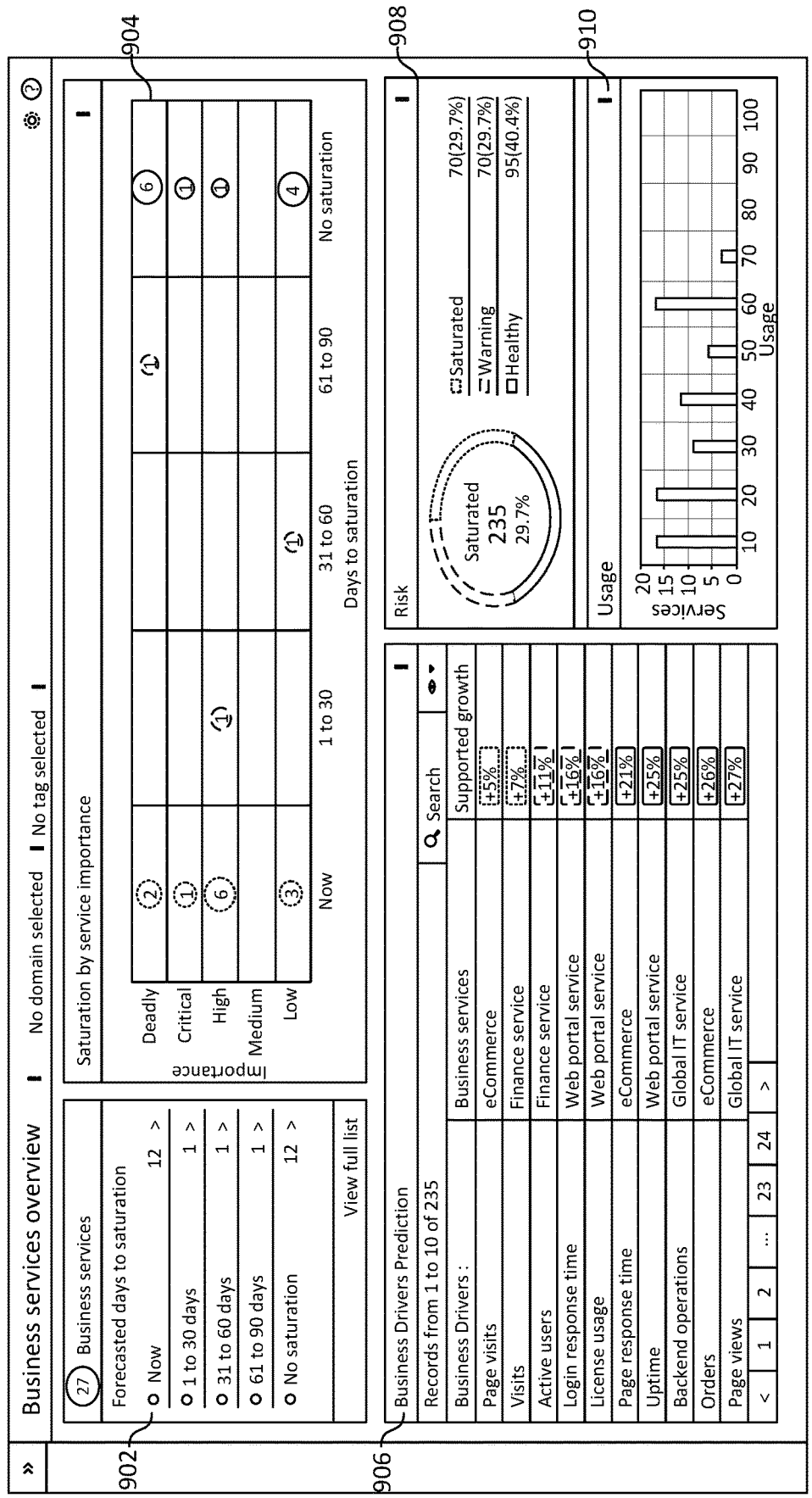
FIG. 9 is a first screenshot illustrating example uses and implementations of FIGS. 1-8.
Figure 10:
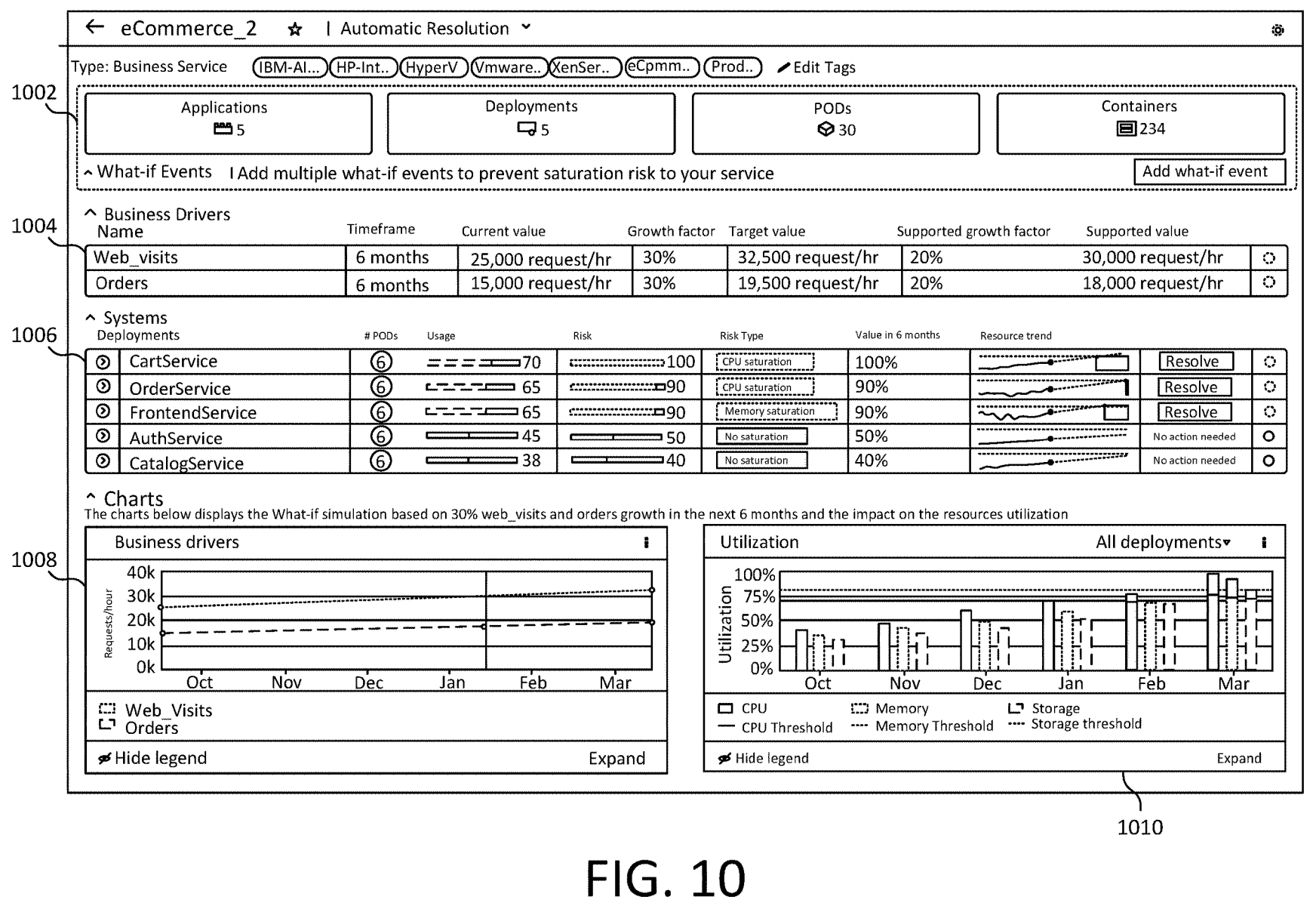

FIG. 9 is a first screenshot illustrating example uses and implementations of FIGS. 1-8. FIG. 10 is a second screenshot illustrating example uses and implementations of FIGS. 1-8.

In the example of FIG. 9, a graphical overview of business services is provided. In a section 902, 27 business services are individually identified with respect to their forecasted days to saturation (e.g., until a bottleneck PM threshold violation is predicted to occur). In a section 904, the business services are ranked by importance with respect to their respective days until saturation.

In a section 906, individual DMs are predicted for the business services and are identified a business drivers. As shown, section 906 illustrates a prediction of the percentage of supported growth available for each business driver. Business drivers may easily be identified as being more or less urgent, based on the available supported growth. For example, the "page visits" business driver for an "eCommerce" business service is illustrated as having only a 5% growth supported, while the "page views" business driver for a "Global IT service" business service can still be supported in 27% growth.

A section 908 illustrates percentages of business drivers at different status levels of, e.g., saturated, warning, or healthy. A section 910 illustrates numbers of the business services that are at various usage levels.

Thus, FIG. 9 provides a business services overview with specific information that enables a user to easily determine current and future needs for resource tuning. Using the above-described techniques discussed and illustrated with respect to FIGS. 1-8, FIG. 9 conveys relevant information to the user with respect to business drivers such as page visits, active users, login response time, license usage, page response time, uptime, backend operations, and orders, all shown with respect to corresponding business services.

FIG. 10 illustrates various example techniques and scenarios related to what-if scenarios. For example, section 1002 enables addition of a new what-if event, which may be added with respect to one or more specific business services, including related applications, deployments, and other system resources. As also illustrated, it is possible to add multiple what-if events to prevent saturation risk to a service being tested.

A section 1004 illustrates business drivers (providing examples of DMs, as already described with respect to FIG. 9) for which values may be simulated in a what-if event. As shown, a business driver such as 'webvisits' or 'orders' may have values for current and future values, with specified assumptions regarding a growth rate over a defined time frame (e.g., 6 months). Accordingly, it is possible to project whether a target value may be reached given an extrapolated growth factor. For example, section 1004 illustrates that if web_visits are targeted to grow by 30% in 6 months to reach 32,500 requests/hour, then saturation will be reached because the greatest supported growth factor 20%, corresponding to 30,000 requests/hour.

A section 1006 illustrates various systems and related deployments of various business services. As shown, each business service may be characterized with respect to corresponding levels of usage, risk, and risk type relative to a projected value in 6 months and graphically, resource trends. Options are provided to resolve projected saturation risks, e.g., by adding or allocating additional system resources.

Sections 1008 and 1010 illustrate the what-if simulation in the specified time frame. Specifically, section 1008 illustrates that percentage growth projected for the business drivers 'web_visits' and 'orders.' The section 1010 illustrates relevant utilization levels of system resources (CPU, memory, storage) for which PMs exist over the 6-month period being projected, relative to PM saturation thresholds.

Thus, FIG. 10 illustrates specific examples of how what-if scenarios may be executed, without requiring any particular knowledge from the user with respect to the underlying correlation and extrapolation techniques (e.g., without having to understand the intricacies of IT landscape infrastructure and system resource utilization). As shown, the what-if scenarios may easily be updated. As described above, the what-if scenarios may also be performed iteratively with associated resource tuning, e.g., until no remaining saturation risks are projected to remain.

Described approaches include innovative ways to provide, for the first time, automated, continuous, accurate, and actionable predictions of demand for system resources as a result of changes in business drivers or other DMs, and to provide IT personnel future change requirements and resource tuning.

Described example problems relate to analyzing data to be able to provide guidance for IT management and operations, for future actions. Described approaches allow, e.g., users lacking the required technical expertise to implement or directly leverage algorithmic solutions to nonetheless predict how business drivers impact IT operations, without requiring a deep understanding of the math or the art of selecting the most appropriate, effective, and accurate correlation and predictive algorithms (including, but not limited to, machine learning algorithms).

In specific examples, driver metrics 108 may include business drivers defined as 1 or more key parameters—numerical time series data which are observable and measurable, over time, and have a significant impact on a business. As such, business drivers have significant impact on the utilization of multiple system resources. IT administrators may use described techniques to allocate system resources in order to provide the best service according to business drivers, now and in the future (proactive), including IT's SaaS challenge of meeting 99.99% (and higher) availability of business services.

Business drivers may be important inputs driving the operational and financial results of a business service. Common examples of business drivers, some of which are described herein, include website traffic, price of goods sold, units of production, commodity prices, foreign exchange rates, and external events affecting the business service. Business drivers may be referred to as described in terms of numerical values over time. Changes in business drivers may have direct and indirect impact on demand levels on system resources, which in turn impact system resource metrics.

In particular, complex clusters require on-going resource tuning in order to sustain the load and provide business services at the highest quality, managing rapid product changes and growth in demand with increasing numbers of end users. The described approach helps solve the ongoing problem of how to best configure IT infrastructure now and into the future without having expertise in either the technology of the IT infrastructure or details of advanced forecasting and of correlation ML/AI algorithms.

The described approach bridges the gap between IT operations and a business service, by providing a predictive model allowing customers to predict system resource utilization as a function of business drivers into the future. Described techniques determine, e.g., an impact of an observed or predicted change in one or more business drivers on the utilization of IT systems, requirements to plan ahead to support future changes in business drivers, and a quantity of change in business drivers' fluctuation that may be supported by an existing IT infrastructure.

In example implementations, the described approach provides users with a service that guides them with recommendations on how to best configure and deploy IT clusters, virtual servers, and virtual machine technologies in order to improve service for a future demand/load. Example implementations of the described approach utilize ML/AI algorithms to forecast behavior of PMs based on potential or predicted correlated DMs and then performs corresponding resource tuning of IT infrastructure system resources. For example, the described approach may select, on the fly, optimal algorithms (including, but not limited to, ML/AI algorithms), thereby removing the need for the user to have a deep understanding of such algorithms.

Described approaches allow IT professionals to plan complex IT infrastructure system resource allocations based on expected future events that may have an impact of the demand for these system resources. Some example use cases are provided above and described in more detail below.

For example, use cases may include a business service that is an eCommerce website, with a challenge of forecasting system resource demands on the backend systems due to expected growth in shoppers.

In this example, a future promotion, sales event, or new product introduction, planned to occur in the future, may be forecasted to increase the numbers of visitors to the website (e.g., on "Black Friday", or upon a new product launch). To plan the required system resources needed to support the future growth, IT professionals need to correlate each of the system resources on every system involved in running the eCommerce system (e.g., website, shopping cart, and credit card processing, to name a few) with the predicted growth in the number of shoppers. An increase in shoppers may not increase the demand in utilization of system resources the same way for all system resources. For example, an increase of 1,000 additional shoppers may increase the CPU utilization of the shopping cart system by 1%, while increasing the CPU utilization of the credit card transaction system by 5%.

Another example is a business service provided by an insurance company, with a challenge of forecasting growth in insurance claims submission rate as a result of extreme weather event (e.g. growing number of customers impacted by floods or storms). In this example, a forecasted extreme weather event may increase the number of claims filed by customers of an insurance company. This expected increase in filed claims may also be expected to increase the load and system resource utilization of the claims management system used by the insurance company. Today, when IT is made aware of a forecasted extreme weather event, personnel are expected to increase system resource allocations for the different systems involved in receiving and processing customers' filed claims based on "best guess" estimates. Using the described approach, including the learning algorithms incorporated in the proposed approaches, IT will be able to accurately predict the increase in system resource utilization based on the magnitude and other characteristics of the forecasted extreme weather event.

In another example referenced above and described in more detail here, a business service may include a stock trading platform, with a challenge that commodity market changes may cause growth in a trading rate within the stock trading platform.

This example describes a use-case in which a change in commodity prices (e.g., the price of gold on the world markets) affects the volume of trades in the stock market. A significant change (either increase or decrease) in commodity prices on world markets, such as precious metals or oil, may be followed by an increase in the volume of stock trades, which, in turn, may increase the demand and system resource utilization of stock trading systems in financial institutions (e.g., banks and online and offline stockbrokers). Using the described approach, IT departments in these financial institutions will be able to accurately forecast the increased demand on the stock trading systems based on changes in commodity prices.

In the context of this described approach, a business service is a logical construct of system resources providing critical business services comprising one or more subservices and applications that enable the business service. Thus, business services are services that the business provides to external customers and utilizes system resources in providing the business service.

Other types of services may be used. For example, IT services may refer to business services that the support organization (or, more generally, a service provider) provides to its customers. Those customers may be internal (i.e., to users inside the business) or external (i.e., to customers). Supporting services may refer to business services that one team provides for another; for example, the IT infrastructure team might provide hosting services for the application management team.

Implementations of the various techniques described herein may be implemented in digital electronic circuitry, or in computer hardware (e.g., an individual IT component, such as a laptop or desktop computer, mainframe, virtual machine, or a server), firmware, software, or in combinations of them. Implementations may be implemented as a computer program product, i.e., a computer program tangibly embodied in an information carrier, e.g., in a machine-readable storage device, for execution by, or to control the operation of, data processing apparatuses, e.g., a programmable processor, a computer, a server, multiple computers or servers, or other kind(s) of digital computer(s). A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors and any one or more processors of any kind of computer (e.g., such as a laptop or desktop computer, mainframe, virtual machine, or a server). Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well, for example, feedback provided to the user can be any form of sensory feedback, e.g., visual feedback, auditory feedback, or haptic or tactile feedback; and input from the user can be received in any form, including acoustic, speech, or haptic or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed by at least one computing device, are configured to cause the at least one computing device to:

determine, as a first time series, performance metric values of a performance metric characterizing a performance of a system resource of an information technology (IT) system, the performance metric having a performance metric threshold at which the performance of the system resource degrades;

determine, as a second time series, driver metric values of a driver metric characterizing an occurrence of an event that is at least partially external to the system resource and having a potential correlation with the performance of the system resource;

perform a correlation analysis between the first time series and the second time series to confirm the potential correlation as a correlation;

identify correlated value pairs of the first time series and the second time series, each value pair occurring at a corresponding point in time, based on the correlation;

train a plurality of extrapolation algorithms to obtain a plurality of trained extrapolation algorithms using a first subset of the correlated value pairs;

validate the plurality of trained extrapolation algorithms to obtain a plurality of validated extrapolation algorithms using a second subset of the correlated value pairs;

select a validated extrapolation algorithm of the validated extrapolation algorithms; and determine a driver metric threshold corresponding to the performance metric threshold, including using the validated extrapolation algorithm to extend a relationship between the performance metric values and the driver metric values until the performance metric threshold is met, to thereby determine the driver metric threshold corresponding to the performance metric threshold; and tune the system resource to improve the performance metric threshold and thereby extend the driver metric threshold.

2. The computer program product of claim 1 wherein the instructions, when executed, are further configured to cause the at least one computing device to:

perform the correlation analysis including removing a first trend of the first time series and a second trend of the second time series.

3. The computer program product of claim 1, wherein the instructions, when executed to perform the correlation analysis, are further configured to cause the at least one computing device to:

calculate an estimate of a Spearman correlation coefficient;

calculate a comparison of the estimate of the Spearman correlation coefficient and a coefficient threshold; and confirm the potential correlation as the correlation based at least in part on the comparison.

4. The computer program product of claim 1, wherein the instructions, when executed, are further configured to cause the at least one computing device to:

calculate a false positive error rate for the potential correlation;

calculate a comparison of the false positive error rate and a false positive error threshold for the potential correlation; and confirm the potential correlation as the correlation based at least in part on the comparison.

5. The computer program product of claim 1, wherein the instructions, when executed to generate the graph, are further configured to cause the at least one computing device to:

generate a graph in which the performance metric values are individually graphed against corresponding ones of the driver metric values to thereby illustrate the value pairs.

6. The computer program product of claim 1, wherein the instructions, when executed, are further configured to cause the at least one computing device to:

iterate, for the driver metric, over a plurality of performance metrics that includes the performance metric, to thereby determine a plurality of performance metric thresholds and corresponding driver metric thresholds; and identify a bottleneck performance metric of the plurality of performance metrics as corresponding to a smallest driver metric threshold of the plurality of driver metric thresholds.

7. The computer program product of claim 1, wherein the instructions, when executed, are further configured to cause the at least one computing device to:

receive a hypothetical driver metric value;

project a hypothetical performance metric value, based on the hypothetical driver metric value and on the validated extrapolation algorithm;

determine that the hypothetical performance metric value exceeds the performance metric threshold;

tune the system resource, based on the exceeding; and determine that an updated hypothetical performance metric value does not exceed the performance metric threshold with the adjusted capacity of the system resource, based on the hypothetical driver metric value and the validated extrapolation algorithm.

8. The computer program product of claim 1, wherein the instructions, when executed, are further configured to cause the at least one computing device to:

train a plurality of prediction algorithms using a first subset of the driver metric values to obtain a plurality of trained prediction algorithms;

validate the plurality of trained prediction algorithms using a second subset of the driver metric values to obtain a plurality of validated prediction algorithms;

select a validated prediction algorithm of the validated prediction algorithms as exceeding a predictability threshold; and predict future driver metric values, using the validated prediction algorithm and the driver metric values.

9. The computer program product of claim 8, wherein the instructions, when executed, are further configured to cause the at least one computing device to:

predict a point in time at which the driver metric will reach the driver metric threshold, using the validated prediction algorithm.

10. A computer-implemented method, the method comprising:

determining, as a first time series, performance metric values of a performance metric characterizing a performance of a system resource of an information technology (IT) system, the performance metric having a performance metric threshold at which the performance of the system resource degrades;

determining, as a second time series, driver metric values of a driver metric characterizing an occurrence of an event that is at least partially external to the system resource and having a potential correlation with the performance of the system resource;

performing a correlation analysis to confirm the potential correlation as a correlation;

identifying correlated value pairs of the first time series and the second time series, each value pair occurring at a corresponding point in time, based on the correlation;

training a plurality of extrapolation algorithms to obtain a plurality of trained extrapolation algorithms using a first subset of the correlated value pairs;

validating the plurality of trained extrapolation algorithms to obtain a plurality of validated extrapolation algorithms using a second subset of the correlated value pairs;

selecting a validated extrapolation algorithm of the validated extrapolation algorithms; and determining a driver metric threshold corresponding to the performance metric threshold, including using the validated extrapolation algorithm to extend a relationship between the performance metric values and the driver metric values until the performance metric threshold is met, to thereby determine the driver metric threshold corresponding to the performance metric threshold; and tuning the system resource to improve the performance metric threshold and thereby extend the driver metric threshold.

11. The method of claim 10, wherein performing the correlation analysis further comprises:
calculating an estimate of a Spearman correlation coefficient;
calculating a comparison of the estimate of the Spearman correlation coefficient and a coefficient threshold; and
confirming the potential correlation as the correlation based at least in part on the comparison.

12. The method of claim 10, wherein performing the correlation analysis further comprises:
calculating a false positive error rate for the potential correlation;
calculating a comparison of the false positive error rate and a false positive error threshold for the potential correlation; and
confirming the potential correlation as the correlation based at least in part on the comparison.

13. The method of claim 10, wherein generating the graph further comprises:
generating a cross-plot graph in which the performance metric values are individually graphed against corresponding ones of the driver metric values.

14. The method of claim 10, further comprising:
iterating, for the driver metric, over a plurality of performance metrics that includes the performance metric, to thereby determine a plurality of performance metric thresholds and corresponding driver metric thresholds; and
identifying a bottleneck performance metric of the plurality of performance metrics as corresponding to a smallest driver metric threshold of the plurality of driver metric thresholds.

15. The method of claim 10, further comprising:
receiving a hypothetical driver metric value;
projecting a hypothetical performance metric value, based on the hypothetical driver metric value and on the validated extrapolation algorithm;
determining that the hypothetical performance metric value exceeds the performance metric threshold;
adjusting a capacity of the system resource, based on the exceeding; and
determining that an updated hypothetical performance metric value does not exceed the performance metric threshold with the adjusted capacity of the system resource, based on the hypothetical driver metric value and the validated extrapolation algorithm.

16. The method of claim 10, further comprising:
training a plurality of prediction algorithms using a first subset of the driver metric values to obtain a plurality of trained prediction algorithms;
validating the plurality of trained prediction algorithms using a second subset of the driver metric values to obtain a plurality of validated prediction algorithms;
selecting a validated prediction algorithm of the validated prediction algorithms as exceeding a predictability threshold; and
predicting future driver metric values, using the validated prediction algorithm and the driver metric values.

17. The method of claim 16, further comprising:
predicting a point in time at which the driver metric will reach the driver metric threshold, using the validated prediction algorithm.

18. A system comprising:
at least one memory including instructions; and
at least one processor that is operably coupled to the at least one memory and that is arranged and configured to execute instructions that, when executed, cause the at least one processor to:
determine, as a first time series, performance metric values of a performance metric characterizing a performance of a system resource of an information technology (IT) system, the performance metric having a performance metric threshold at which the performance of the system resource degrades;
determine, as a second time series, driver metric values of a driver metric characterizing an occurrence of an event that is at least partially external to the system resource and having a potential correlation with the performance of the system resource;
perform a correlation analysis to confirm the potential correlation as a correlation;
identify correlated value pairs of the first time series and the second time series, each value pair occurring at a corresponding point in time;
train a plurality of extrapolation algorithms to obtain a plurality of trained extrapolation algorithms using a first subset of the correlated value pairs;
validate the plurality of trained extrapolation algorithms to obtain a plurality of validated extrapolation algorithms using a second subset of the correlated value pairs;
select a validated extrapolation algorithm of the validated extrapolation algorithms; and
determine a driver metric threshold corresponding to the performance metric threshold, including using the validated extrapolation algorithm to extend a relationship between the performance metric values and the driver metric values until the performance metric threshold is met, to thereby determine the driver metric threshold corresponding to the performance metric threshold; and
tune the system resource to improve the performance metric threshold and thereby extend the driver metric threshold.

19. The system of claim 18, wherein the instructions, when executed, are further configured to cause the at least one processor to:
train a plurality of prediction algorithms using a first subset of the driver metric values to obtain a plurality of trained prediction algorithms;

validate the plurality of trained prediction algorithms using a second subset of the driver metric values to obtain a plurality of validated prediction algorithms;

select a validated prediction algorithm of the validated prediction algorithms as exceeding a predictability threshold;

predict future driver metric values, using the validated prediction algorithm and the driver metric values; and predict a point in time at which the driver metric will reach the driver metric threshold, using the validated prediction algorithm.

* * * * *